(12) United States Patent
Janssens

(10) Patent No.: US 6,301,628 B1
(45) Date of Patent: Oct. 9, 2001

(54) BUS COMMUNICATION SYSTEM

(75) Inventor: Mark A. E. Janssens, Leuven (BE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/132,401

(22) Filed: Aug. 11, 1998

(30) Foreign Application Priority Data

Aug. 12, 1997 (EP) .................................................. 97202485

(51) Int. Cl.[7] .................................................. G06F 13/00
(52) U.S. Cl. .................................................. 710/110; 710/10
(58) Field of Search ...................... 710/110, 10; 709/208, 709/227

(56) References Cited

U.S. PATENT DOCUMENTS

| 5,708,799 | * | 1/1998 | Gafken et al. | 326/37 |
| 5,931,902 | * | 8/1999 | Shindoh et al. | |
| 6,011,781 | * | 1/2000 | Bell | 370/254 |

* cited by examiner

*Primary Examiner*—David Wiley

(57) ABSTRACT

In a USB system, pull-up of the potential of a communication line is used to detect the presence of a bus station. According to the invention, a switching element is used to start pull-up only after completion of an initialization program in the bus station, so that it is guaranteed that no communication occurs until after completion of the initialization program.

8 Claims, 1 Drawing Sheet

US 6,301,628 B1

BUS COMMUNICATION SYSTEM

BACKGROUND OF THE INVENTION

The invention relates to a bus communication system as described in the precharacterizing part of claim 1. A USB (Universal Communication Bus) system is an example of such a communication bus system. The USB system provides for detection of devices connected to the bus. A USB master station, for example a PC, contains a resistor connected between a communication line and ground. A peripheral station, for example a display monitor, contains a resistor connected between the communication line and a power supply terminal.

Thus, when the peripheral station is connected to the communication line, the potential of the communication line will be pulled towards the level of the potential on the power supply terminal. When the peripheral station is not connected to the communication line or when it is switched off, the potential of the communication line will remain at ground level. The master station monitors the potential of the bus line before it starts communication. If the potential is at or near ground level, the master station concludes that no active peripheral station is connected to the communication line and the master station does not start communication. If the master station detects that the potential of the communication line is more than a threshold away from the ground level, the master station concludes that an active peripheral station is connected to the bus and the master station will start communication if desired.

When the peripheral station is switched-on it will preferably execute an initialization program. It is desirable that during execution of this initialization program no communication occurs via the communication line. In principle this can be realized by executing the initialization program very quickly so that initialization is complete before the master station can respond to detection of the peripheral station, but this places severe restraints on the speed of the peripheral station.

SUMMARY OF THE INVENTION

It is an object of the invention to enable a station connected to the communication line to prevent communication when this station executes an initialization program.

The communication bus system according to the invention is characterized by the characterizing part of claim 1. By actively controlling the potential of the communication line so that during execution of the initialization program the potential remains at a level as if the slave station is still switched-off, the slave station uses the mechanism for detecting the presence of stations to prevent iniatives of the master station until the initialization program is completed.

BRIEF DESCRIPTION OF THE DRAWING

These and other advantageous aspects of the invention will be described by way of non-limitative example using the attached figures.

BRIEF DESCRIPTION OF THE PREFERRED EMBODIMENTS

Figure 1:
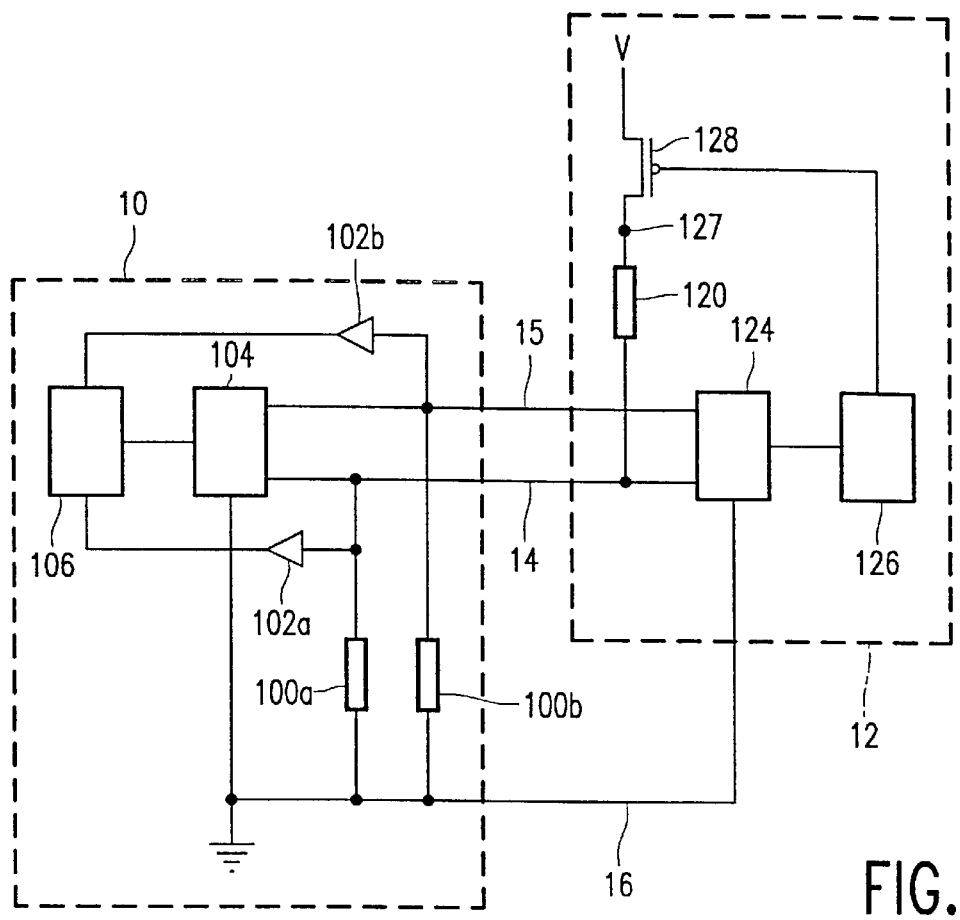
FIG. 1 shows a second embodiment of the communication bus system according to the invention.

FIG. 1 shows a communication bus system containing a first station 10, a second station 12 and electrically conductive communication lines 14, 15 connecting the two stations 10, 12. In addition the stations 10, 12 a connected by a ground line 16.

The first station 10 (for example a PC) contains resistors 100a,b connected between the communication lines 14, 15 respectively and ground 16. Furthermore the first station 10 contains a control unit 106 and a communication interface 104 connected between the communication lines 14, 15 on one hand and the control unit 106 on the other hand. The first station contains level detectors 102a,b having an input coupled to the communication lines 14, 15 respectively and outputs connected to the control unit 106.

The second station 12 (for example a display monitor or a printer) contains a resistor 120 connected between the communication lines 14, 15 and a node 127. A main current channel of a transistor 128 is connected between the node 127 and a supply terminal V. The second station also contains a control unit 126 and a communication interface 124 connected between the control unit 126 and the communication lines 14, 15. The control unit 126 has an output coupled to a control electrode of the transistor 128.

In normal operation the transistor 128 will be switched to a conductive state, causing the potential of the communication line 14 to be drawn towards the level of the potential at the supply terminal V. For example, the resistor 100a in the first station 10 has a resistance value of 15 KOhm, the resistor 120 in the second station has a resistance value of 1.5 KOhm and the potential at the supply terminal V is 3.3V relative to ground 16. The 3.3V supply is also used to supply the control unit 126 (e.g. a microcontroller) and the communication interface 124.

Detector 102a detects that the potential of communication line 14 deviates more than a threshold level (say 1V) from ground potential and signals this to control unit 106.

If second station 12 were not connected to the communication lines, resistor 100a would draw the potential of the communication line 14 to ground potential and the detector 102a would detect that the potential of communication line 14 deviates less than a threshold level (say 1V) from ground potential and would signal this to control unit 106.

Control unit 106 will start communication with the second station 12 only when control unit 106 concludes that the second station 12 is present because the detector 102a signals that the potential of communication line 14 deviates more than a threshold level (say 1V) from ground potential. For communication the communication interfaces 104, 124 contain for example two-way drivers and receivers.

When the second station 12 is switched on its control unit 126 will start executing an initialization program, which initializes second station 12 to a state where it is ready to exchange communication with the first station 10 (for example by initializing the content of various registers, initializing the contents of a frame buffer etc.). This initialization program will be started automatically upon switch-on of the second station. Upon switch-on the control unit 126 keeps the potential of the control electrode of the transistor 128 kept at a high level, preventing conduction through the main current channel of the transistor 128. Thus, the resistor 100a of the first station 10 will keep the potential of the communication line 14 at the ground level. Once the initialization program has completed, the control unit 126 lowers the potential of the control electrode of the transistor 128, so that it becomes conductive. As a result the potential of the communication line 14 is pulled up nearly to the potential of the power supply terminal V. The detector 102a detects this and signals it to the control unit 106 of the first station. The control unit 106 of the first station 10 will then be free to start communication with the second station.

Preferably the control unit 126 of the second station 12 makes transistor 128 conductive by means of a program instruction whose execution follows completion of the initialization program. Thus, the transistor 128 can be used to signal readiness for communication promptly upon said completion and this readiness is signalled quickly because signalling requires only the switch-on of transistor 128.

To make transistor 128 conductive use can also be made of a timer (not shown) which starts upon switching-on the second station and makes transistor 128 conductive after a predetermined time interval which is sufficiently long to execute the initialization program.

Control unit 126 and transistor 128 can be implemented in a conventional microcontroller. In this case one of the output pins of the microcontroller may be used as node 127 for connecting one terminal of resistor 120 (the other terminal being connected to the communication line 14).

The USB system uses two communication lines 14, 15 for communication of multi-bit digital information messages. During this communication the potentials of the two communication lines 14, 15 make mutually complementary transitions, so that the communication signal is essentially differential. A state in which the potential of both communication lines 14, 15 is at ground level is an illegal state during such communication. Such a state occurs when no second station 12 is attached to the communication lines 14, 15, or when an attached second station 12 is not yet switched on or when that second station executes its initialization program.

In the USB bus system any one of the communication lines 14, 15 may be pulled with a resistor 120 to indicate the presence of a second station. The first station 10 selects a speed of communication depending on which one of the communication lines 14, 15 is pulled high. Clearly, the second station 12 needs to be equipped only to pull one of the communication lines high and needs the transistor 128 only for that line. However, one may also use two transistors, one for each communication line 14, 15. In that case the control unit 126 can select the speed with which it wants to communicate by pulling the appropriate communication line 14, 15 high after completing the initialization program.

Figure 2:
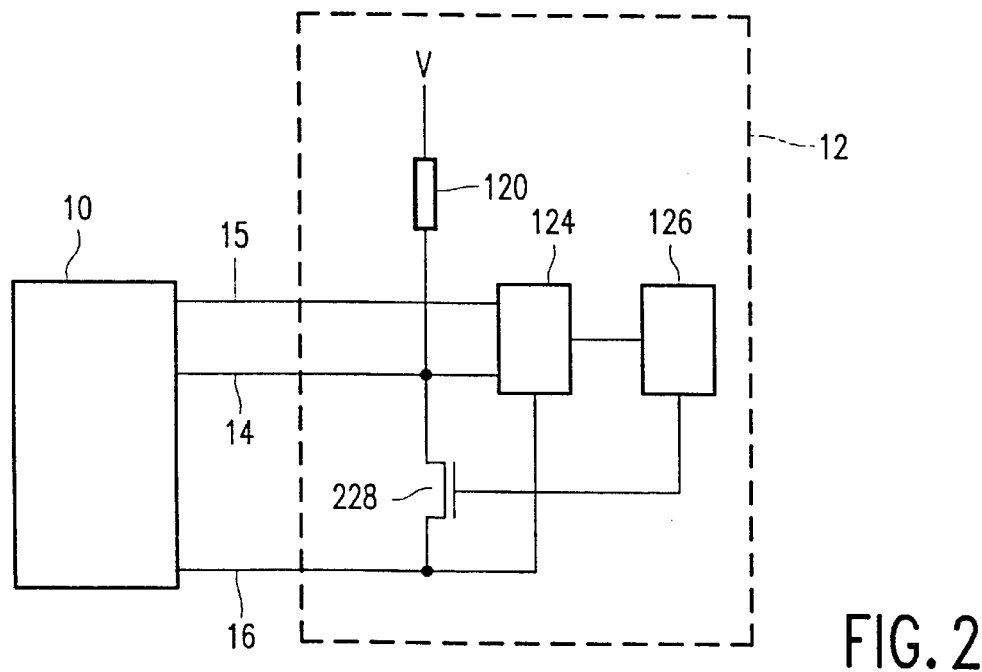
FIG. 2 shows a first embodiment of the communication bus system according to the invention.

FIG. 2 shows a second communication bus system. Components of this system that are similar to those of FIG. 1 have be given corresponding references. The difference with FIG. 1 is that resistor 120 is connected directly to the power supply terminal V and instead of transistor 128, the second station contains a transistor 228 whose main current channel is connected between the communication line 14 and ground 16. The control electrode of transistor 228 is connected to an output of control unit 226.

In operation, the control unit 126 keeps the transistor 228 in a conductive state from switch-on until the control unit 126 has completed the initialization program, so that the potential of the communication line 14 remains at ground potential from switch-on until after execution of the initialization program has been completed. After that the transistor 228 is made unconductive to allow the potential of the communication line 14 to be pulled up by resistor 120 so that the first station may detect the presence of the second station 12. The transistor 228 may also be used for transmitting normal multi-bit communication messages from the second station 12 to the first station.

The pull-down transistor 228 will need to be larger than the pull-up transistor 128, because the pull-down transistor must be able to overrule the resistor 120 which has a fairly low resistance value (e.g. 1.5 KOhm) in order that this resistor 120 in turn can overrule the resistor 100 in the first station 10. In contrast, the pull-up transistor 128 only needs to help to overrule the larger resistor 100 in the first station 10. However, both transistors can be used individually or in combination to signal readiness of the second station quickly upon completion of the initialization program. Additionally to pull-up transistor 128 a pull-down transistor (not shown) could also be attached to node 127, with its control electrode tied to that of pull-up transistor 128 to help keep the potential of the communication line 14 at ground level during execution of the initialization program.

Preferably the communication functions of station 12 is integrated on an integrated circuit, which contains the control unit (for example in the form of a microcontroller), the communication interface 124 and the transistor 128 or 228. The resistor 120 may be external to this integrated circuit (which allows for an accurate resistor) or internal to that integrated circuit. Instead of a resistor any known resistive element (such as a permanently on transistor with a low W/L ratio) may be used. The resistive function may be combined with the switching function for example by using a transistor 128 with low W/L ratio without a physically separate resistor.

What is claimed is:

1. Bus communication system comprising a master station, a slave station and a conductive communication line connecting the master and slave station, the slave station comprising a pulling circuit for pulling a potential of the communication line away from a level which would obtain if the slave station were switched off, the slave station starting said pulling after the slave station is switched-on, the master station comprising a detector for detecting said pulling so as to detect availability of the slave station, the master station taking initiative to communicate with the slave station only if said availability is detected, characterized in that the slave station is arranged to start said pulling only after completing execution of an initialization program which follows switching-on of the slave station.

2. Bus communication system according to claim 1, wherein the pulling circuit comprises a switching element and a resistive element having a first and second terminal, the first terminal being connected to the communication line, the second terminal being connected to a power supply terminal via the switching element, the slave station making the switching element conductive only after completing execution of the initialization program.

3. Bus communication system according to claim 2, wherein the slave station contains instruction code which the slave station executes in response to switch-on, the instruction code containing the initialization program followed by an instruction to make the switching element conductive.

4. Bus communication system according to claim 2, the slave station containing a driver circuit, for driving the potential of the communication line during transmission of multi-bit messages to the master station, the driving circuit being connected to the communication line in parallel with said pulling circuit.

5. Bus communication system according to claim 1, wherein the pulling circuit comprises a resistive element having a first and second terminal, the first terminal being connected to the communication line, the second terminal being connected to a power supply terminal, the slave station comprising a switching element connected between the communication line and a terminal carrying said level; the slave station keeping the switching element conductive upon switch-on and during execution of the initialization program, the slave station making the switching element unconductive upon completing the initialization program.

6. Bus communication system according to claim 5, wherein the slave station contains instruction code which the slave station executes in response to switch-on, the instruction code containing the initialization program followed by an instruction to make the switching element unconductive.

7. Bus communication system according to claim 1, comprising a further communication line, the master and slave station communicating binary information by means of mutually complementary potential transitions on the communication line and the further communication line, the slave station leaving the further communication line at said level on switch-on, the master station detecting unavailability for communication when neither the communication line nor the further communication line is pulled away from said level.

8. A bus communication station suitable for use as a slave station in a bus communication system according to claim 1.

* * * * *